United States Patent
Lenischenko

(10) Patent No.: US 9,782,831 B2
(45) Date of Patent: Oct. 10, 2017

(54) CUTTING INSERT HAVING STRUCTURED TOOL FLANKS

(75) Inventor: Stefan Lenischenko, Schömberg (DE)

(73) Assignee: Walter AG, Tübingen (DE)

( * ) Notice: Subject to any disclaimer, the term of this patent is extended or adjusted under 35 U.S.C. 154(b) by 560 days.

(21) Appl. No.: 13/989,113

(22) PCT Filed: Dec. 16, 2011

(86) PCT No.: PCT/EP2011/073074
§ 371 (c)(1),
(2), (4) Date: Jul. 24, 2013

(87) PCT Pub. No.: WO2012/084718
PCT Pub. Date: Jun. 28, 2012

(65) Prior Publication Data
US 2014/0010608 A1    Jan. 9, 2014

(30) Foreign Application Priority Data
Dec. 20, 2010 (DE) .................. 10 2010 063 611

(51) Int. Cl.
*B23B 27/16* (2006.01)
*B23B 27/22* (2006.01)
(Continued)

(52) U.S. Cl.
CPC ............ *B23B 27/22* (2013.01); *B23B 27/145* (2013.01); *B23B 2200/128* (2013.01); *B23C 5/20* (2013.01);
(Continued)

(58) Field of Classification Search
CPC .............. B23B 27/22; B23B 2200/128; B23B 2220/125; B23B 2220/126;
(Continued)

(56) References Cited

U.S. PATENT DOCUMENTS 5,382,118 A * 1/1995 Satran et al. .................. 407/42
5,443,334 A * 8/1995 Pantzar .................. B23C 5/207
407/113

(Continued)

FOREIGN PATENT DOCUMENTS

CN    1123726    6/1996
CN    1849192    10/2006
(Continued)

OTHER PUBLICATIONS

Office Action (with English translation) for Chinese Application No. 201180060349.9 dated Oct. 20, 2014.
(Continued)

*Primary Examiner* — Will Fridie, Jr.
(74) *Attorney, Agent, or Firm* — Morgan, Lewis & Bockius LLP

(57) ABSTRACT

The invention concerns a cutting insert comprising an upper and a lower surface and one or more edge surfaces which connect the upper surface and the lower surface together, wherein provided at the transition of at least one edge surface at least to the upper surface is at least one cutting edge, wherein the upper surface adjoining the cutting edge is in the form of a chip surface and the edge surface adjoining the cutting edge is in the form of a tool flank. To provide a cutting insert in which the chip break range is enlarged and the risk of damage to the cutting insert and/or the tool and/or the workpiece by coiling chips is reduced it is provided according to the invention that at least one recess is provided in the tool flank at a spacing from the cutting edge.

11 Claims, 9 Drawing Sheets

Figure 1:
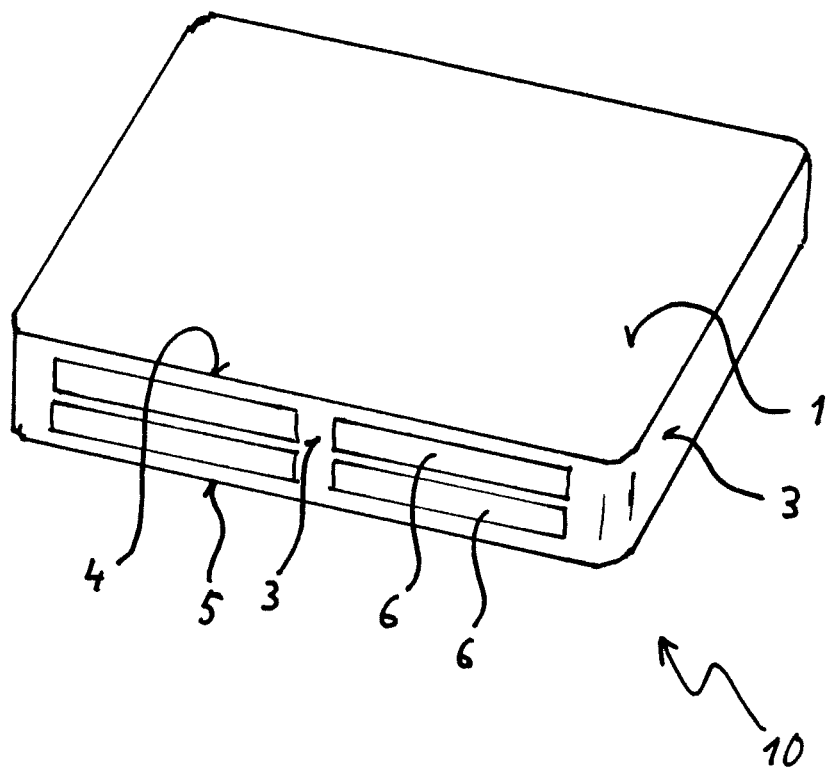

(51) Int. Cl.
 *B23B 27/14* (2006.01)
 *B23C 5/20* (2006.01)

(52) U.S. Cl.
 CPC ..... *B23C 2200/128* (2013.01); *Y10T 407/235* (2015.01); *Y10T 407/24* (2015.01)

(58) Field of Classification Search
 CPC ........ B23C 2200/128; B23C 2200/125; B23C 2200/126
 See application file for complete search history.

(56) References Cited

U.S. PATENT DOCUMENTS

| | | | | |
|---|---|---|---|---|
| 5,718,540 | A * | 2/1998 | Satran et al. | 407/42 |
| 5,803,674 | A | 9/1998 | Satran et al. | |
| 6,607,335 | B2 * | 8/2003 | Morgulis | 407/40 |
| 6,929,429 | B2 * | 8/2005 | Riviere | 407/113 |
| 8,206,066 | B2 * | 6/2012 | Men | B23C 5/202 407/113 |
| 8,454,278 | B2 | 6/2013 | Hartlohner et al. | |
| 8,491,231 | B2 * | 7/2013 | Edler | B23B 27/145 407/103 |
| 8,491,234 | B2 * | 7/2013 | Fang | B23C 5/109 407/113 |
| 8,496,415 | B2 | 7/2013 | Zitzlaff et al. | |
| 2006/0210364 | A1 | 9/2006 | Bellmann et al. | |
| 2010/0054873 | A1 * | 3/2010 | Men et al. | 407/42 |
| 2010/0124465 | A1 * | 5/2010 | Morrison et al. | 407/42 |
| 2012/0195700 | A1 * | 8/2012 | Chen et al. | 407/40 |
| 2013/0336732 | A1 * | 12/2013 | Jansson | 407/47 |

FOREIGN PATENT DOCUMENTS

| | | | |
|---|---|---|---|
| CN | 101668605 | 3/2010 | |
| DE | 43 36 055 | 3/1995 | |
| DE | 196 00 172 | 8/1997 | |
| DE | 199 44 406 | 5/2001 | |
| DE | 103 61 450 | 7/2005 | |
| EP | 2 546 012 | 1/2013 | |
| GB | 1 500 732 | 2/1978 | |
| GB | 1500732 * | 2/1978 | ............... 407/40 |
| JP | 2007-515303 | 6/2007 | |
| JP | 2010530314 | 9/2010 | |
| WO | 2004/050314 | 6/2004 | |
| WO | 2005/065874 | 7/2005 | |
| WO | 2010/101514 | 9/2010 | |
| WO | WO 2010/097797 | 9/2010 | |
| WO | WO 2010/134700 | 11/2010 | |
| WO | WO 2011/111197 | 10/2015 | |

OTHER PUBLICATIONS

Office Action (with English translation) for Chinese Application No. 201180060349.9 dated Jun. 25, 2015.
German Search Report for 10 2010 063 611.8 dated Aug. 26, 2011.
International Search Report for PCT/EP2011/073074 dated Mar. 28, 2012.
International Preliminary Report on Patentability with Written Opinion for International Application No. PCT/EP2011/073074, dated Jun. 25, 2013.
Notice of Reasons for Rejection (with English Translation) for Japanese Application No. 2013-543818, dated Oct. 13, 2015.
Notice of Reasons for Rejection (with English translation) for Japanese Application No. 2013-543818 dated Jun. 7, 2016.

\* cited by examiner

CUTTING INSERT HAVING STRUCTURED TOOL FLANKS

The invention concerns a cutting insert with at least one structured tool flank, wherein the cutting insert comprises an upper and a lower surface and one or more edge surfaces which connect the upper surface and the lower surface together, wherein provided at the transition of at least one edge surface at least to the upper surface is at least one cutting edge, wherein the upper surface adjoining the cutting edge is in the form of a chip surface and the edge surface adjoining the cutting edge is in the form of a tool flank.

Such a cutting insert is known for example from DE 43 36 055 A1. In that state of the art the important consideration is in particular achieving an improved cutting action and a reduction in the tool flank or relief surface wear, insofar as the tool flank or relief surface has changing relief angles along the cutting edge. For that purpose there are provided selectively recesses or raised portions projecting from the tool flank, which extend on the tool flank to relatively close to the cutting edge in order to cause the effect of the changing relief angles to be operative. In specific terms corresponding recesses extend to the cutting edge as far as 0.2 mm, wherein raised portions preferably project to the cutting edge even as far as 0.1 mm. The recesses and/or raised portions are relatively short in a direction parallel to the cutting edge so that a plurality of recesses and/or raised portions alternate with interposed flat regions of the tool flank so that a change in the respective relief angle correspondingly frequently occurs along the cutting edge.

Apart from some part-spherically shaped impressions in an embodiment otherwise all embodiments of the cutting inserts in the aforementioned publication involve recesses and/or raised portions which extend with their largest dimensions perpendicularly to the cutting edge.

In that respect the cutting performance of the cutting insert is intended to be smoothed by better guidance and a further reduction in vibration, wherein in particular the aim is to achieve a reduction in tool flank wear, a reduction in the tendency to chatter and a reduction in the forces normal to the cut. For that purpose the recesses or raised portions are provided in such a way that there are locally continually changing relief angles.

Accordingly the above-mentioned document is concerned with the specific chip formation and contact of the tool flank with the workpiece immediately behind the active cutting edge, wherein specific chip formation and equally tool flank wear depend very greatly on the material being machined and the cutting depth. It does not consider however the influence of the tool flanks on the chips which have already occurred.

In many applications relatively long coiling chips are formed in particular because of the properties of the workpiece material. If such coiling chips encounter the regions of the tool flank, which are clear beside the workpiece surface (if in particular only a part of the cutting edge is in engagement with the workpiece), such chips have a tendency to slide along against the tool flank, in which case they can easily pass into the narrow gap between the reversible bit and the bit seat or also into the gap between the tool flank behind the active cutting edge portion and the workpiece surface. In the case for example of double-sided reversible cutting bits, that can lead to the lower cutting edge being torn off. Such long coiling chips preferentially occur with small cutting depths and low feeds.

Typically therefore suitable cutting inserts for certain materials are limited in their application to a respective given range of advance movements and cutting depths, within which reliable chip breakage occurs, while the application in other advance and cutting depth ranges is avoided or is not recommended in particular in regard to the formation of detrimental chips. The recommended range of advances and cutting depths is also referred to as the chip break range.

Therefore the object of the present invention is to provide a cutting insert in which the risk of damage to the cutting insert and/or the tool and/or the workpiece due to coiling chips is reduced and the chip break range is enlarged.

That object is attained in that at least one recess is provided in the tool flank at a spacing from the cutting edge.

In that case the length of the recess or recesses, such length possibly being summed in the case of a plurality of recesses, as measured parallel to the cutting edge, is preferably at least 30% and in particular at least 40% of the length of the associated cutting edge (that is to say generally the most closely adjacent one). In the case of a plurality of recesses provided in succession in a direction parallel to the cutting edge therefore the length of those recesses is to be added along that direction, to satisfy the aforementioned condition.

Unlike known cutting inserts with structured cutting surfaces, in which a varying relief angle is an important consideration and the extent of the recesses or raised portions, as measured parallel to the cutting edge, plays only a subordinate part, the important consideration with the present invention is that a chip which impinges on the exposed tool flank impinges as much as possible on a recess and is 'hooked' in that recess and as a result possibly breaks and is carried away before it passes into the above-described critical regions. The chip break range is effectively enlarged thereby. The recess therefore may not be excessively small and must also be sufficiently deep, in which case the generally flat regions of the tool flank, that are not involved by the recess, are substantially restricted to the portion directly adjoining the cutting edge.

In particular the recess can be in the form of a groove extending parallel to the cutting edge. In that case the spacing of the recess or groove relative to the cutting edge should be at least a tenth of the minimum spacing between the upper and lower surfaces of the cutting insert, wherein that spacing can also be briefly defined as the 'thickness' of the cutting insert. It will be noted however that the spacing of the recess relative to the cutting edge should as far as possible also be no greater than a third of the thickness of the cutting insert. In absolute numbers the spacing of the recesses from the cutting edge is in the range of at least 0.3 to a maximum of 3 mm.

The recesses according to the invention should be relatively abruptly set back from the tool flank, that is to say the angle between the inside surface of a recess and the immediately adjoining tool flank should be at least 45°, preferably being of the order of magnitude of 60° to 90°. The depth of the recesses, measured from the adjoining flat portions of the tool flank, should be a minimum of 0.1 mm, preferably at least 0.3 mm. The depth required at a maximum to achieve the desired chip breakage effect is about 1 to 1.5 mm. Greater depths do not have any greater influence worth mentioning on the chip breakage behaviour, even if they would be harmless in that respect.

As the tool flank adjoining the cutting edge extends sufficiently far between the cutting edge and the recess, and the recess is therefore sufficiently spaced from the cutting edge, the recess does not have any direct influence on chip formation. Rather, the effect of such a recess is that, in contrast to smooth tool flanks or those with less abrupt and less deep recesses, chips which are produced at the active portion of the cutting edge bend in that case (for example in the form of a so-called coiling chip) and are then incident on the tool flank, do not slide along the tool flank and in that case possibly pass into the gap between the tool flank and the workpiece, but rather become 'hooked' in such a recess, which very quickly leads to breakage of such a chip which can then be more easily transported away and reduces the risk of damage. The recesses according to the invention therefore have primarily no influence on the generation of the chips, but on the behaviour of the chips which have already been produced, in particular on chip breakage, which however should occur as quickly as possible after the chip is formed.

A single suitably large recess can be arranged on a tool flank; however a plurality of recesses can also be arranged on the same tool flank, more specifically both in mutually juxtaposed and also mutually superposed relationship, in which case 'mutually juxtaposed' refers to an arrangement of a plurality of recesses in a direction parallel to the cutting edge and 'mutually superposed' refers to an arrangement of a plurality of recesses in a direction perpendicular to the cutting edge.

In a variant of the present invention there are provided two parallel grooves which in turn respectively involve the same spacing relative to the upper and the lower surface respectively.

The spacing of the recesses or grooves from the cutting edge tends to be somewhat greater than the spacing provided for another purpose in the recesses known from the state of the art and, as already mentioned, is at a minimum a tenth of the thickness of the cutting insert, preferably at least 0.3 mm or even more than 1 mm, for example 1.5 mm. In the case of double-sided cutting inserts the tool flanks are desirably also of a correspondingly symmetrical configuration and accordingly either have a plurality of recesses, of which one is associated with the cutting edge at the upper surface and the other is associated with the cutting edge at the lower surface, or however a recess which is not interrupted between the upper and lower cutting edges is of a symmetrical configuration with respect to the upper and lower cutting edges. The symmetrical arrangement and configuration of one or more such recesses ensures that the function of the cutting insert is independent of the orientation with which the cutting insert is fixed in a seat on the tool, in respect also of breakage and destruction of chips. Apart from the recesses the edge surfaces of the cutting insert in accordance with the present invention can be substantially flat, that is to say in particular the relief angle remains substantially constant over the length of the cutting edge, unless the tool flank were asymmetrically tilted in addition to the provision of one or more recesses, or unless it is provided for other reasons that the relief angle continuously or also discontinuously changes along the cutting edge.

It will be appreciated that the claimed spacing of the grooves or recesses from the associated cutting edge only refers in each case to the active portion of a cutting edge or the tool flank region which directly adjoins same and which is acted upon by chips. Particularly in the case of turning, frequently only a small portion of a cutting edge adjoining a cutting corner comes into engagement with the workpiece. In such a case the recess in the tool flank does not necessarily maintain throughout a large spacing relative to the cutting edge, but in a portion which is sufficiently far away from the active portion of the cutting edge, it can also extend closer to the cutting edge or can also break through that (inactive) cutting edge region.

Desirably the cutting insert is in the form of a double-sided reversible bit, in which the upper and lower surfaces are substantially the same and, depending on their respective orientation, alternately change their function as a chip surface or as a surface which rests on a tool seat.

The invention can also be applied in particular to indexable, for example polygonal, cutting inserts having at least three and preferably at least four substantially flat edge surfaces which have the recesses according to the invention. Equally the invention could be applied in relation to round cutting inserts, in which case the recesses could then for example extend completely therearound or could also be grooves extending only portion-wise in the peripheral direction.

In an embodiment of the invention the recesses or corresponding grooves extend over the entire length of an otherwise flat tool flank into the corner regions of adjacent edge surfaces adjoining the tool flank.

It will be noted however that such grooves can also be interrupted and for example can comprise two groove-shaped portions which on the one hand do not extend beyond a corner to an adjacent edge surface and which on the other hand are also interrupted approximately in the centre beneath a cutting edge by a limb, the surface of which lies in the plane of the rest of the tool flank.

In addition recesses and in particular grooves can also be so provided that they extend beyond the corner regions of a cutting insert which is polygonal in plan view. The recesses or corresponding grooves can possibly be provided in relation to an indexable polygonal cutting insert and extend parallel to the cutting edge in the tool flank.

It will be appreciated that the spacing relative to the cutting edge must be respectively sufficiently large to not adversely affect strength and stability of the cutting edge. That is required in particular when the wall of the recess, that is towards the cutting edge, is set back relatively abruptly, that is to say it extends at a relatively large angle of for example 60° or more relative to the plane of the tool flank.

In the case of an indexable cutting insert having a plurality of edge surfaces provided with corresponding grooves or other recesses, the effect of breaking coiling chips is achieved in particular when the chips impinge on a tool flank which is adjacent to or also spaced in relation to the active tool flank, that is to say the tool flank which adjoins the currently active cutting edge, this being related to the extent of such coiling chips in many situations of use.

Figure 2:
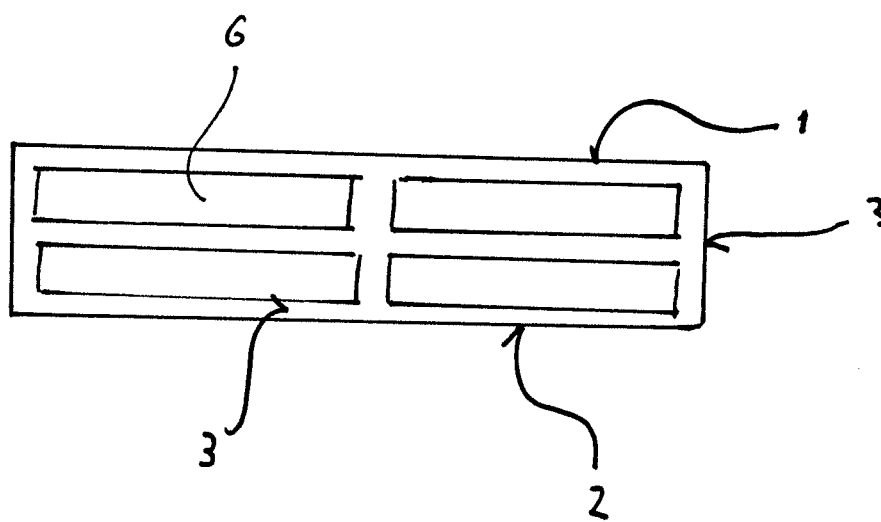
Figure 8:
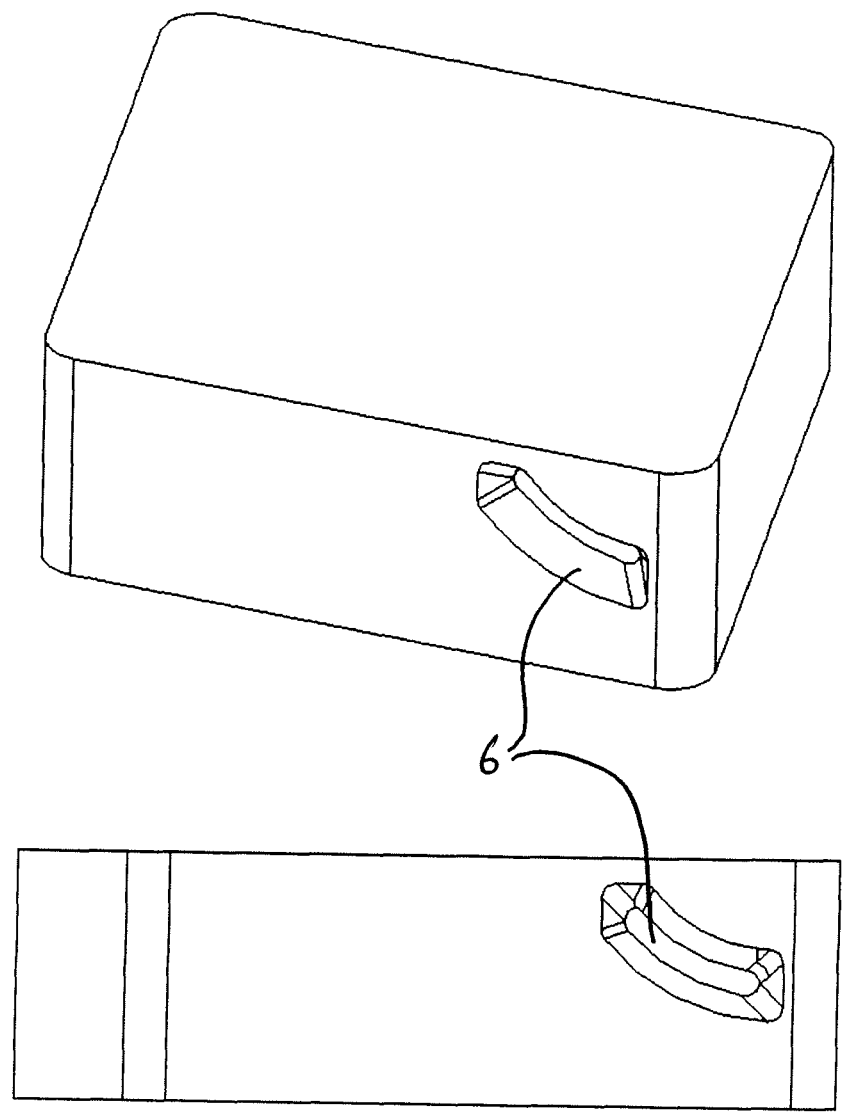
Figure 9:
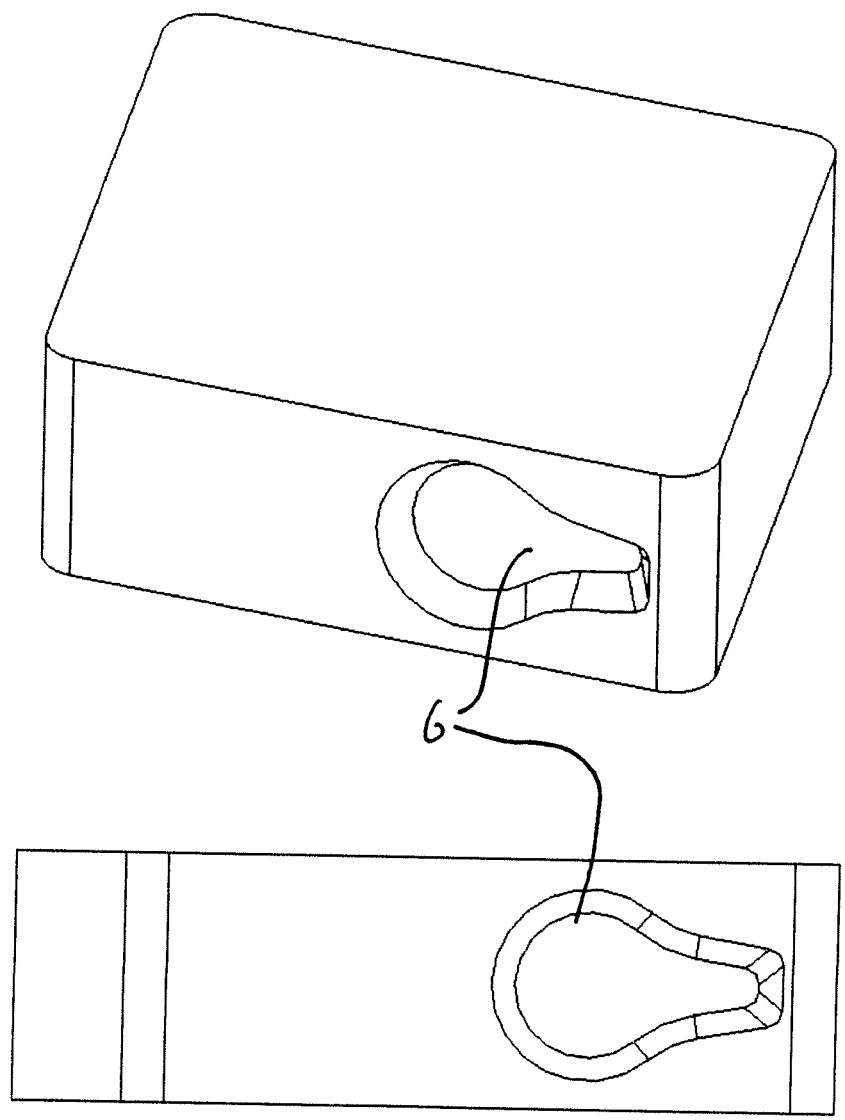
Figure 10:
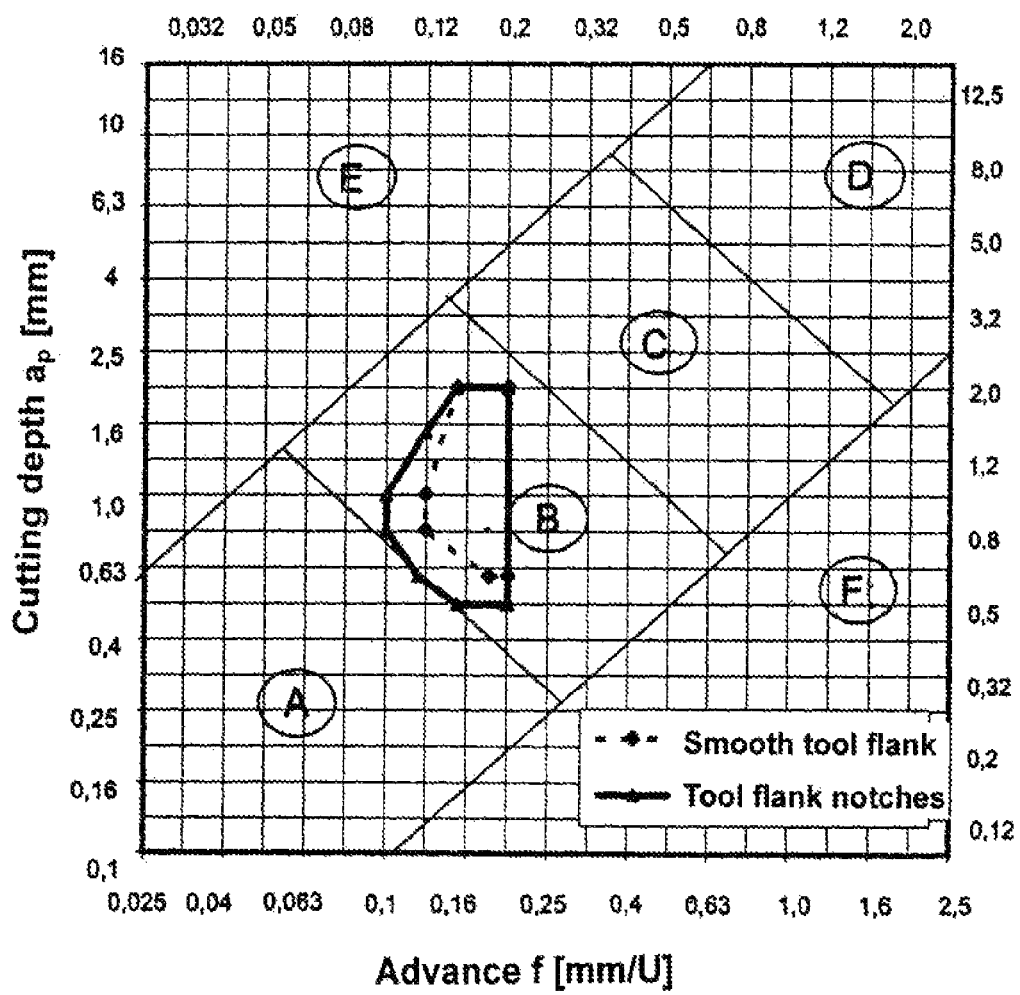

Further advantages, features and possible uses of the present invention will be clearly apparent from the description hereinafter of a preferred embodiment and the associated Figures in which:

FIG. 1 shows a perspective view of a cutting insert according to the invention in accordance with a first embodiment, FIG. 2 shows a side view of a corresponding cutting insert, FIGS. 3 to 9 show various variants of recesses in the edge surfaces of cutting inserts, and FIG. 10 shows a chip break diagram.

FIG. 1 shows a perspective plan view of a substantially square cutting insert 10 having an upper surface 1, a lower surface 2 (not visible in FIG. 1) and substantially flat edge surfaces 3. A respective cutting edge 4 and 5 is provided at the transition between at least one of the edge surfaces 3 and the top side 1 and the underside 2 respectively. The tool flank or relief surface 3 which adjoins those cutting edges 4, 5 and which extends between those cutting edges 4, 5 has four groove-shaped, symmetrically arranged recesses which are separated from each other by a narrow limb. The internal spacing d of the recess from an associated cutting edge 4 or 5 is at most a third of the thickness D of the cutting insert which is substantially defined by the spacing between the cutting edges 4, 5 or the spacing of the top side 1 from the underside 2. If the top side 1 and the underside 2 are to be structured, that is to say are to have raised portions and/or depressions, then the spacing between the surface regions of the upper surface 1 and the lower surface 2, that come closest to each other, can also be used as the scale for the thickness D.

The spacing of the groove-shaped recesses 6 relative to the cutting edges 4, 5 should however also not be any larger in each case than a quarter of that thickness D so that the recesses are sufficiently large in relation to the size or thickness of the cutting insert, in their turn.

Cutting edges can also be provided at the transition of the other edge surfaces 3 to the upper side 1 and the lower side 2 and in that case it will be appreciated that the other edge surfaces should also have corresponding recesses 6 which however are not shown in FIG. 1.

The side view in FIG. 2 shows once again the tool flank 3 with four asymmetrically arranged groove-like recesses 6.

The respectively largest surfaces of the cutting inserts are referred to as the upper surface 1 and the lower surface 2, in which case for comparison purposes the gross dimensions of the surface are used, that is to say without the area claimed for example by a fixing bore. The edge surfaces 3 are accordingly the smaller surfaces which connect the upper and lower surfaces 1, 2 together.

It will be appreciated that the groove-like recesses 6 would not have to be separated by a central limb but that a respective recess 6 could extend in the form of a continuous groove parallel to the cutting edge 4 or the cutting edge 5 respectively. It is equally possible to provide in place of two recesses in mutually superposed relationship, that is to say a recess associated with the cutting edge 4 and one with the cutting edge 5, a single continuous recess or groove 6 which is preferably of a symmetrical configuration with respect to the upper and lower cutting edges.

Different configurations and arrangements of recesses 6 can be seen in FIGS. 3 to 9 which each show a different cutting insert at the top as an isometric view and at the bottom in a slightly turned side view. All cutting inserts shown in FIGS. 3 to 9 are cuboidal and are square with rounded corners in plan view.

Figure 3:
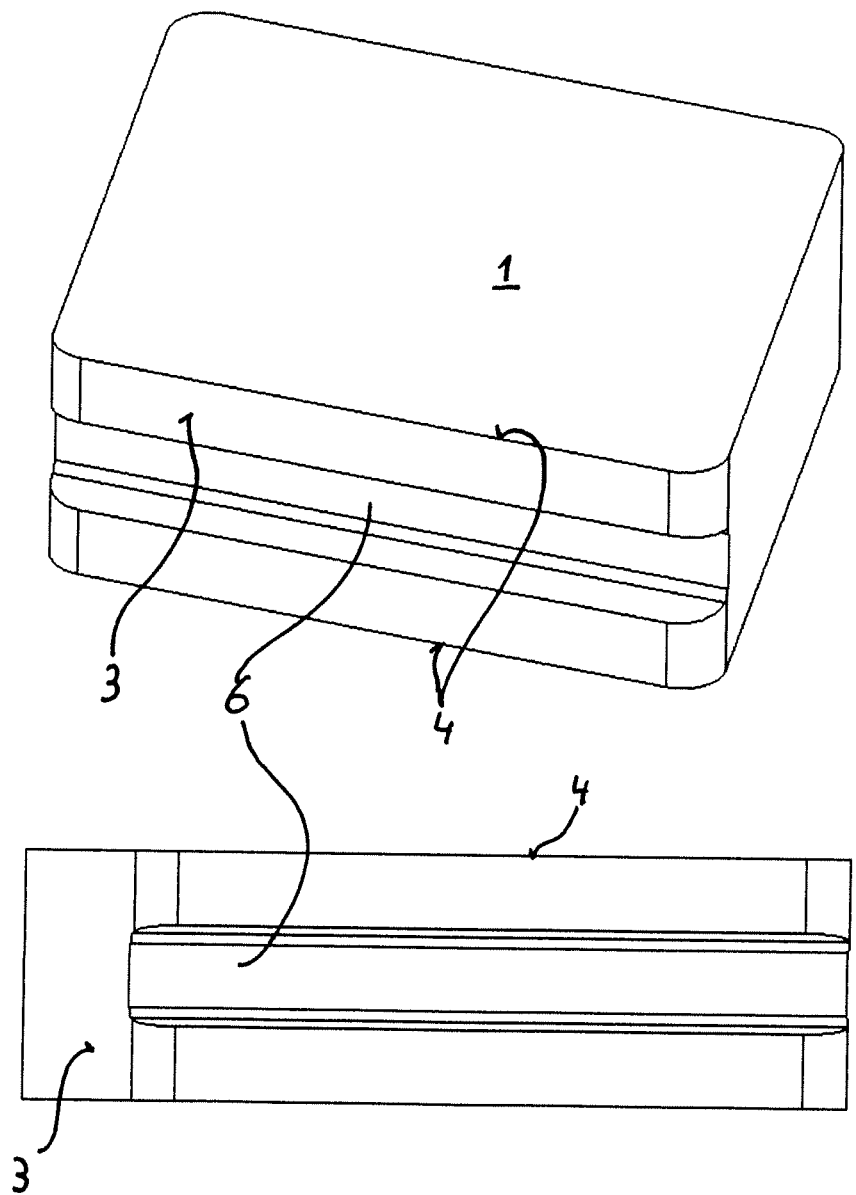

In an embodiment as shown by way of example in FIG. 3 a groove 6 extends over the entire length of an edge surface 3 and parallel to the cutting edges 4 and 5 respectively, more specifically into the corner regions towards the adjacent edge surfaces 3 and possibly also beyond same.

Figure 4:
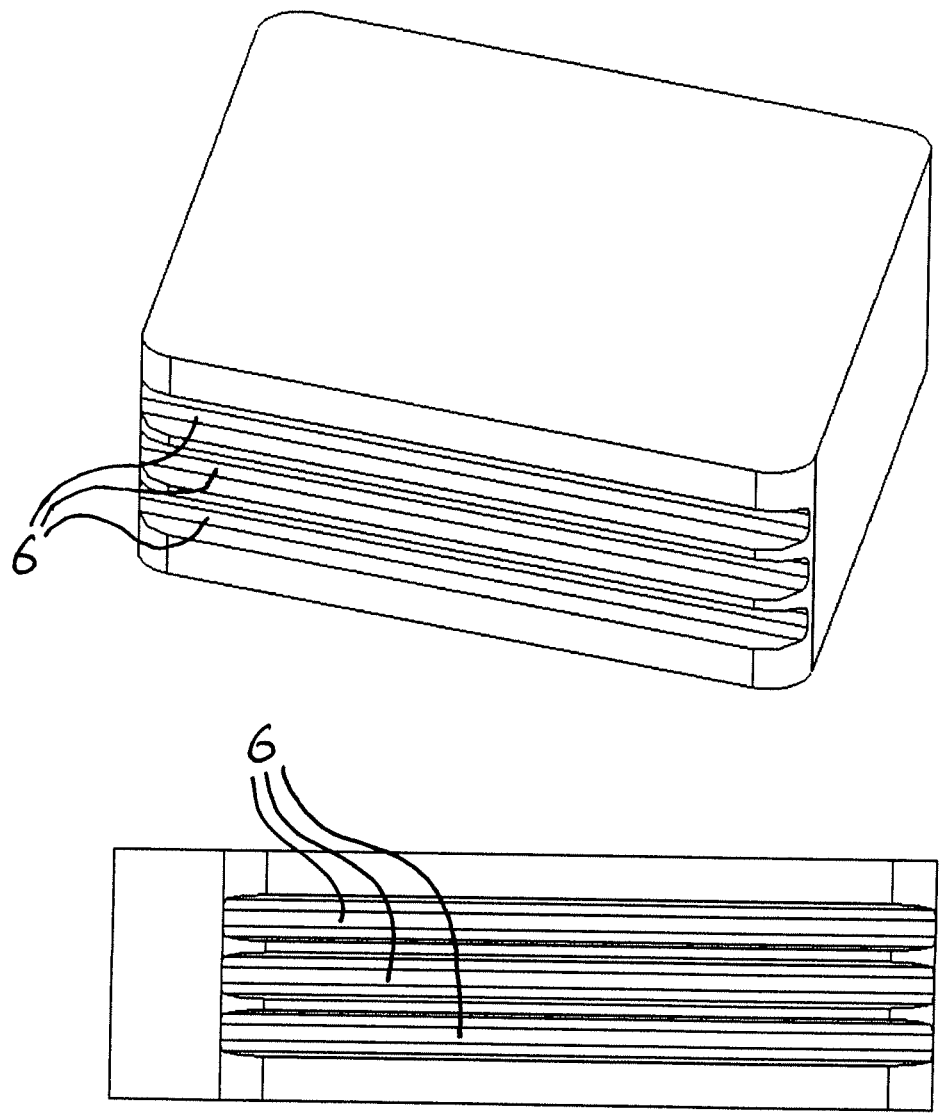

That also applies to the embodiment in FIG. 4 which has three parallel grooves extending over the entire length of the tool flank 3.

Figure 5:
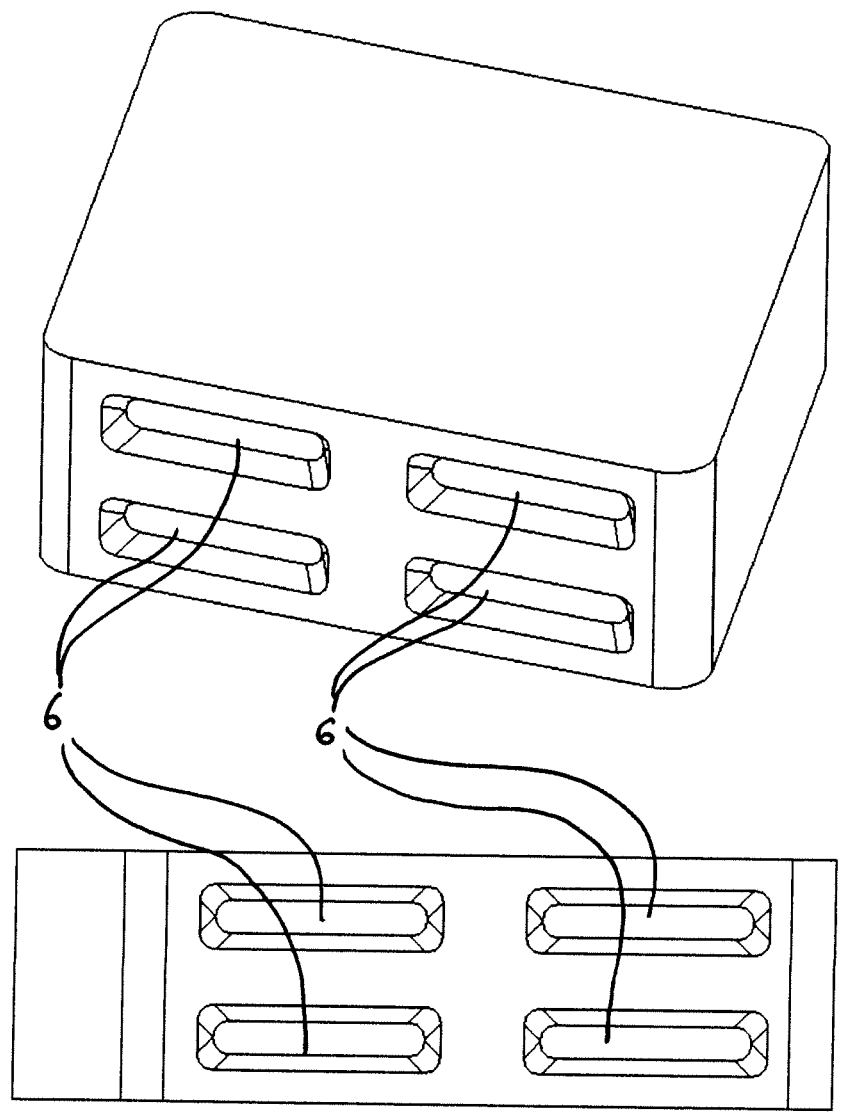
Figure 6:
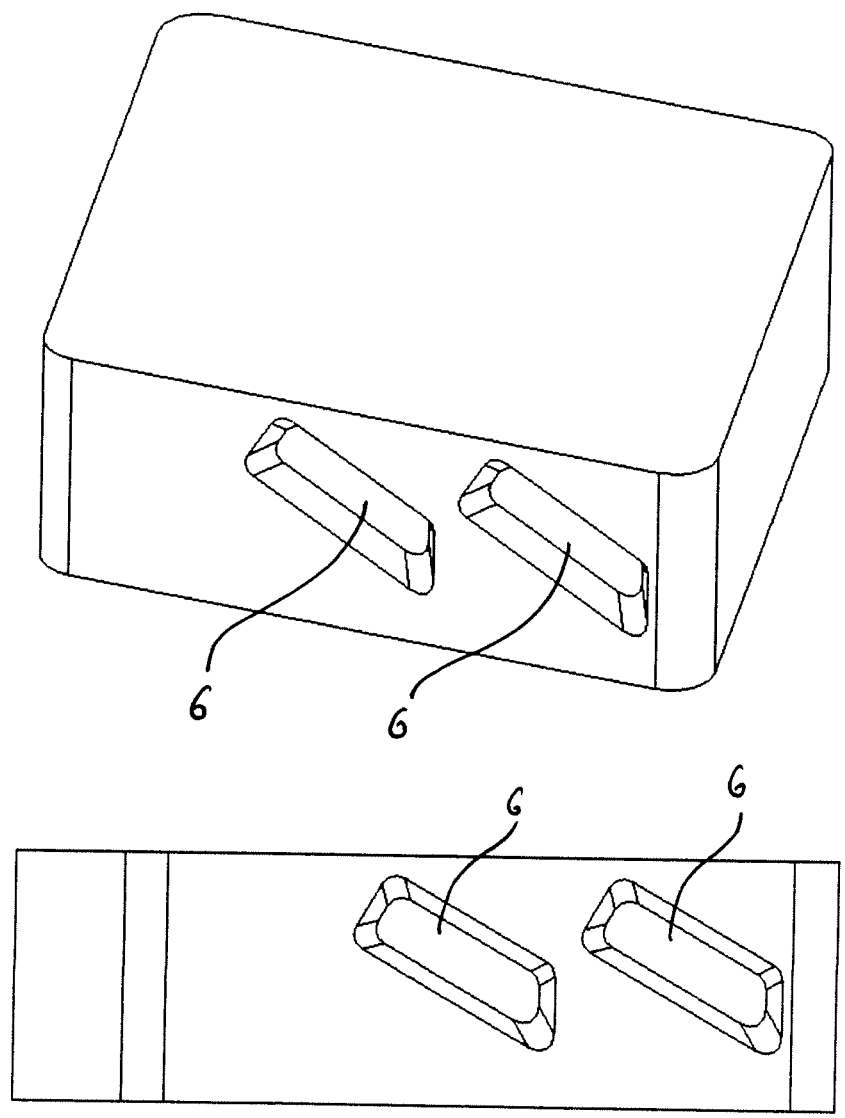
Figure 7:
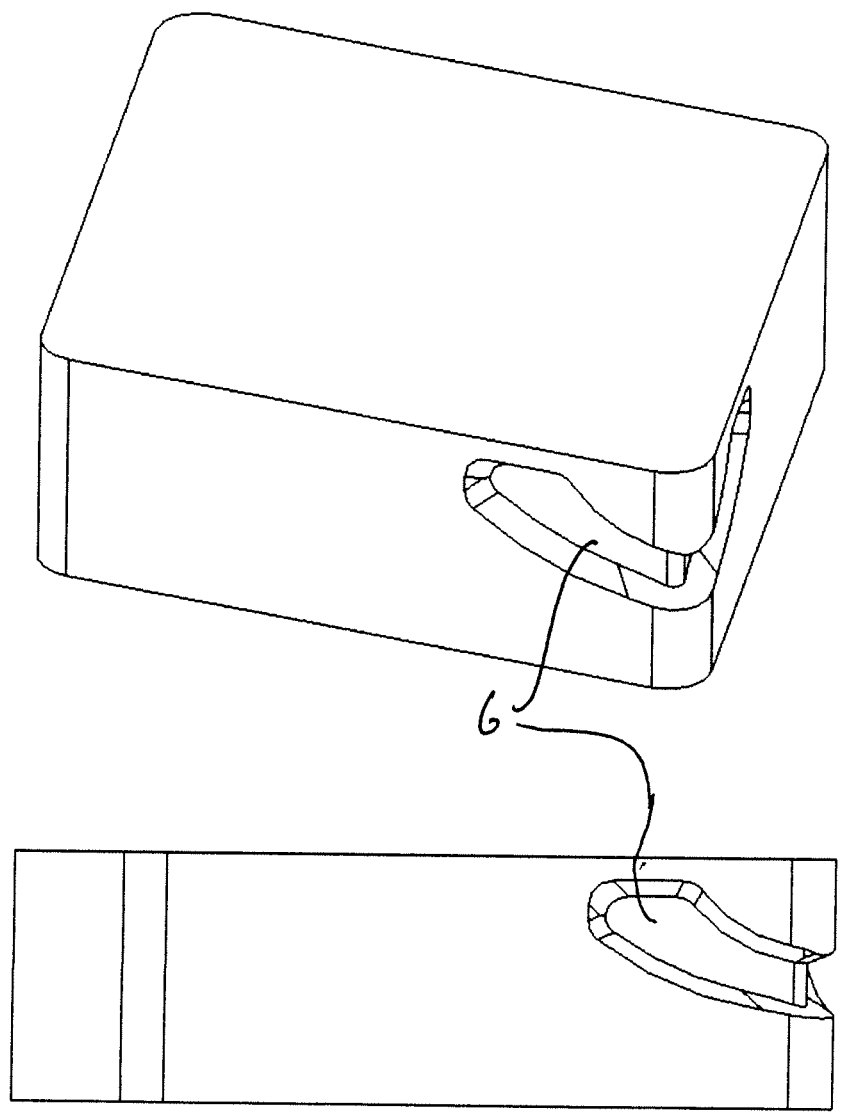

In FIG. 5 there are four recesses 6 which correspond to the arrangement in FIGS. 1 and 2. FIG. 6 shows two recesses 6 which are displaced asymmetrically towards a cutting corner and which extend inclinedly relative to the cutting edge 4. FIG. 7 shows a recess which extends beyond a corner of the cuboidal cutting insert and which extends symmetrically with respect to an angle bisector through the corner. FIG. 8 shows a variant with only one recess 6 which is displaced asymmetrically towards a cutting corner and FIG. 9 shows a cutting insert with a drop-shaped recess 6.

The recesses 6 may but do not necessarily have to be arranged symmetrically with respect to the cutting edge 4 or the cutting edge centre. Depending on the respective area of use involved, as shown in the embodiments by way of example, the recesses can also be displaced asymmetrically towards a corner and may also extend for example beyond a corner region, as shown by way of example in FIG. 7. It will be appreciated that the reversible cutting bits according to the invention can also have a central fixing bore, even if that is not shown in the individual embodiments.

FIG. 10 shows a so-called chip break diagram in which (in the field B) there is delimited with a partly broken and a continuous line an area which delimits possible parameter ranges of advance and cutting depth, at which acceptable chip breakage can be established. In that case the broken line together with the continuous line shown to the right thereof delimits the parameter range possible with cutting bits which have smooth tool flanks. As will be seen, that range can be markedly enlarged in the direction of lower advances and lower cutting depths, as is indicated by the region circumscribed overall with a solid line, if the cutting bits are provided with recesses 6 in the tool flanks, as was described hereinbefore by means of examples. That enlargement of the parameter range is of significance in particular in regard to a good surface quality for the machined workpiece.

For the purposes of the original disclosure it is pointed out that all features as can be seen by a man skilled in the art from the present description, the drawings and the accompanying claims, even if they are described in specific terms only in connection with certain other features, can be combined both individually and also in any combinations with others of the features or groups of features disclosed herein insofar as that has not been expressly excluded or technical aspects make such combinations impossible or meaningless. A comprehensive explicit representation of all conceivable combinations of features and emphasis of the independence of the individual features from each other is dispensed with here only for the sake of brevity and readability of the description.

The invention claimed is:

1. A cutting insert comprising an upper and a lower surface and one or more edge surfaces which connect the upper surface and the lower surface together,
   wherein provided at a transition of at least one edge surface at least to the upper surface is at least one cutting edge,
   wherein the upper surface adjoining the cutting edge is in the form of a chip surface and the edge surface adjoining the cutting edge is in the form of a tool flank,
   wherein the cutting insert as an indexable cutting insert has at least three substantially flat edge surfaces which are angled relative to each other said flat edge surfaces forming tool flanks,
   wherein at least one recess is provided in at least two of the tool flanks at a spacing from the cutting edges and at a spacing from the lower surface,
   wherein the recesses are in the form of a groove extending parallel to the cutting edge that ends before the corner transition to an adjacent tool flank,
   wherein each recess comprises side walls, which are angled by an angle of more than 60° relative to the plane of the tool flank, and
   wherein each recess has a depth of at least 1 mm with respect to the plane of the adjoining tool flank.

2. A cutting insert according to claim 1 wherein the recess, measured parallel to the cutting edge, extends over a length which corresponds to at least 30% of the length of the associated cutting edge.

3. A cutting edge according to claim 1 wherein the recess is at a spacing from the cutting edge that corresponds at least to a tenth of the minimum spacing between the upper and lower surfaces of the cutting insert.

4. A cutting insert according to claim 1 wherein the recess has a minimum spacing relative to the cutting edge that corresponds at most to a quarter of the maximum spacing between the upper and lower surfaces.

5. A cutting insert according to claim 1 wherein the cutting insert is in the form of a double-sided reversible bit in which the upper surface and the lower surface are of the same configuration and serve as a chip surface or a support surface depending on the respective orientation.

6. A cutting insert according to claim 5 wherein the recess is symmetrical with respect to the adjacent upper and lower cutting edges.

7. A cutting insert according to claim 1 wherein a plurality of mutually separated recesses are provided on a tool flank.

8. A cutting insert according to claim 2 wherein the recess, measured parallel to the cutting edge, extends over a length which corresponds to at least 60% of the length of the associated cutting edge.

9. A cutting insert according to claim 1 wherein the recesses are of a depth of at least 1.5 mm with respect to the plane of the adjoining tool flank.

10. A cutting insert according to claim 1 wherein the cutting insert as an indexable cutting insert has at least four substantially flat edge surfaces which are angled relative to each other and of which at least two have the recess or recesses.

11. A cutting insert according to claim 1 wherein the recess, measured parallel to the cutting edge, extends over a length which corresponds to at least 40% of the length of the associated cutting edge.

* * * * *